United States Patent
Bargheer et al.

(10) Patent No.: US 7,503,625 B2
(45) Date of Patent: Mar. 17, 2009

(54) AIR SUPPLY DEVICE FOR A VEHICLE SEAT

(75) Inventors: Claudio Bargheer, Holzgerlingen (DE); Dietmar Hartmann, Deckenpfronn (DE); Karl Pfahler, Stuttgart (DE); Lothar Renner, Nufringen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/553,162

(22) PCT Filed: Feb. 25, 2004

(86) PCT No.: PCT/EP2004/001825
§ 371 (c)(1),
(2), (4) Date: Jun. 29, 2006

(87) PCT Pub. No.: WO2004/091967
PCT Pub. Date: Oct. 28, 2004

(65) Prior Publication Data
US 2006/0261645 A1   Nov. 23, 2006

(30) Foreign Application Priority Data
Apr. 16, 2003   (DE) ................. 103 17 511

(51) Int. Cl.
*A47C 7/72* (2006.01)
(52) U.S. Cl. .................. 297/180.14; 297/180.12; 454/120
(58) Field of Classification Search .......... 297/180.14, 297/180.15, 180.1, 180.12; 454/120
See application file for complete search history.

(56) References Cited

U.S. PATENT DOCUMENTS

| 4,572,430 A | 2/1986 | Takagi et al. |
| 5,002,336 A | 3/1991 | Feher |
| 5,102,189 A | 4/1992 | Saito et al. |
| 5,137,326 A | 8/1992 | George |

(Continued)

FOREIGN PATENT DOCUMENTS

DE   1 123 220   8/1962

(Continued)

OTHER PUBLICATIONS

PCT/ISA/237 Including English Translation of relevant portion (Six (6) pages).

(Continued)

*Primary Examiner*—Anthony D Barfield
(74) *Attorney, Agent, or Firm*—Crowell & Moring LLP

(57) ABSTRACT

An air supply device for a vehicle seat has an air channel arranged on the pressure side of a blower. The channel comprises at least one air discharge opening provided in the upper region of the seat for supplying the head, shoulder and neck area of an occupant of the seat with an adjustable airflow. A heating element is arranged in the air channel between the blower and the air discharge opening. In order to provide the air supply device with an airflow which feels more comfortable to the occupant of the seat, a grid element is arranged inside the air channel between the air discharge opening and the heating element. As a result, the airflow emerging from the air discharge opening is homogenized and slowed down, and this slowing-down allows more heat to be transferred to the airflow from the heating element.

13 Claims, 3 Drawing Sheets

U.S. PATENT DOCUMENTS

| | | | |
|---|---|---|---|
| 6,761,399 B2 * | 7/2004 | Bargheer et al. | 297/180.12 |
| RE39,394 E * | 11/2006 | Suzuki et al. | 297/180.1 |
| 2002/0003362 A1 * | 1/2002 | Kunkel et al. | 297/180.14 |
| 2002/0057006 A1 * | 5/2002 | Bargheer et al. | 297/180.14 |
| 2003/0132650 A1 | 7/2003 | Bargheer et al. | |

FOREIGN PATENT DOCUMENTS

| | | |
|---|---|---|
| DE | 34 23 657 A1 | 3/1985 |
| DE | 36 09 095 C2 | 10/1986 |
| DE | 87 00 003.2 U | 4/1987 |
| DE | 39 25 809 A1 | 2/1991 |
| DE | 196 54 370 C1 | 1/1998 |
| DE | 19949935 C1 | 11/2000 |
| DE | 20104173 U1 | 7/2001 |
| DE | 10054010 C1 | 1/2002 |
| DE | 10163050 A1 | 7/2003 |
| DE | 10163051 A1 | 7/2003 |
| DE | 10228356 B3 | 1/2004 |
| EP | 0217752 A2 | 4/1987 |
| EP | 217752 A2 * | 4/1987 |
| EP | 1323573 A2 | 7/2003 |
| EP | 1323574 A2 | 7/2003 |
| GB | 2208542 A * | 4/1989 |
| JP | 54-99241 U | 7/1979 |
| JP | 56-14713 U | 2/1981 |
| JP | 61-253239 A | 11/1986 |
| JP | 1-99266 U | 7/1989 |
| JP | 3-64552 U | 6/1991 |
| JP | 7-266841 A | 10/1995 |
| WO | WO 03/106215 A1 | 12/2003 |

OTHER PUBLICATIONS

German Search Report dated Mar. 2004 including English Translation of relevant portion (Three (3) pages).

Translator's English language abstract of JP 3-64552 U previously submitted on Jun. 27, 2008.

Translator's English language abstract of JP 1-99266 U previously submitted on Jun. 27, 2008.

Mechanical English language abstract of JP 1-99266 U previously submitted on Jun. 27, 2008.

Mechanical English language abstract of JP 3-64552 U previously submitted on Jun. 27, 2008.

Translator's English language abstract of JP 54-99241 previously submitted on Jun. 27, 2008.

Translator's English language abstract of JP 56-14713 U previously submitted on Jun. 27, 2008.

English language translation of DE 1 123 220 previously submitted on Jun. 27, 2008.

English language abstract of DE 36 09 095 previously submitted on Jun. 27, 2008.

English language translation of DE 87 00 003.2 U1 previously submitted on Jun. 27, 2008.

English language abstract of DE 39 25 809 A1 previously submitted on Jun. 27, 2008.

English language abstract of DE 34 23 657 A1 previously submitted on Jun. 27, 2008.

* cited by examiner

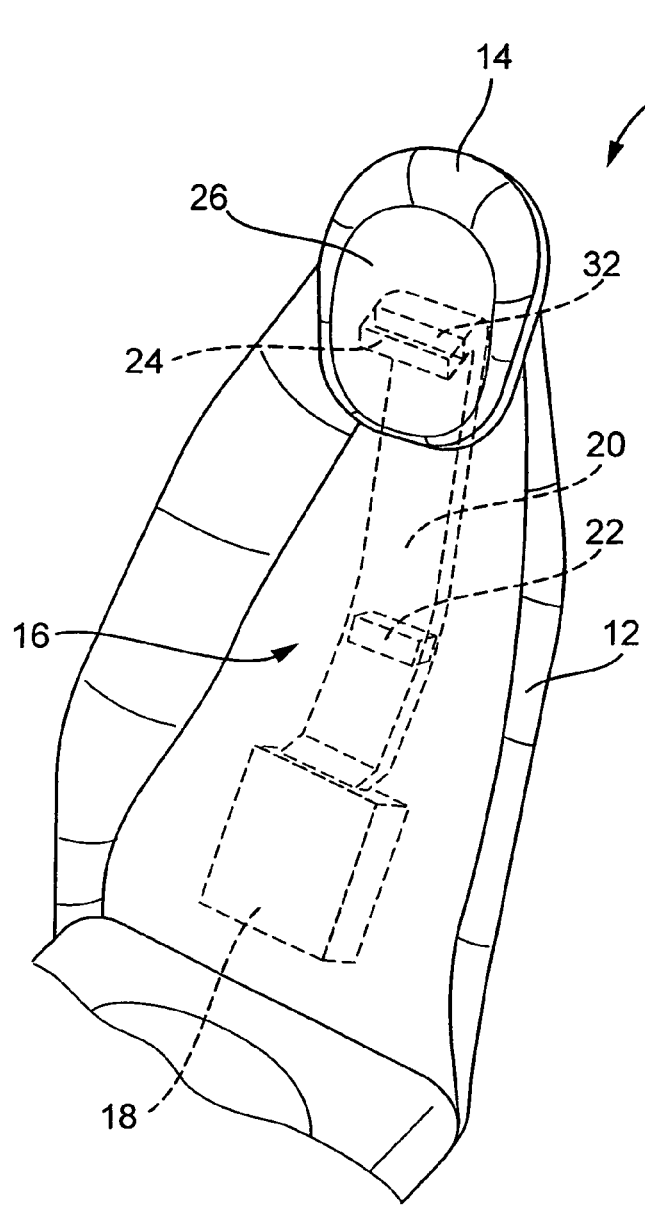
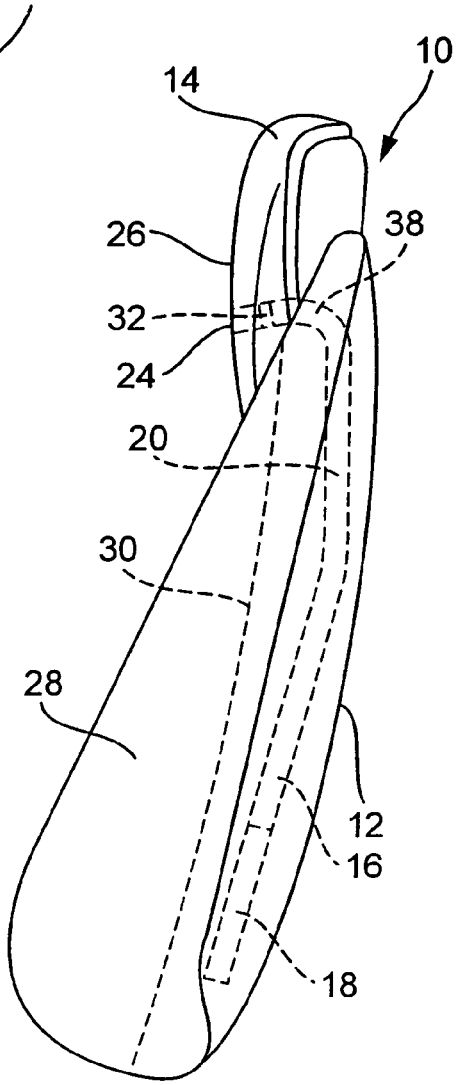
Fig. 1a
Fig. 1b

AIR SUPPLY DEVICE FOR A VEHICLE SEAT

BACKGROUND AND SUMMARY OF THE INVENTION

This invention relates to an air supply device for a vehicle seat.

An air supply device with an air channel arranged on the pressure side of a blower, which channel comprises an air discharge opening in the upper region of the seat for supplying the head, shoulder and neck area of an occupant of the seat with an adjustable airflow, is already known from German document DE 100 54 010 C1. In this device, a heating element is provided inside the air channel between the blower and the air discharge opening.

It is an object of the invention to provide an air supply device of the kind mentioned in which the airflow is overall more homogeneous and better adjustable.

According to the invention, this object is achieved by the claimed air supply device. Advantageous embodiments with expedient developments of the invention are defined by the dependent claims.

In the air supply device according to the invention, a grid element, by which turbulence of the airflow which has arisen inside the heating element is moderated, or the airflow is homogenized after flowing through the heating element, is arranged inside the air channel between the air discharge opening and the heating element. This results in an airflow which emerges more uniformly and at a slightly lower rate from the air discharge opening of the air supply device and which overall feels very comfortable to the occupant of the seat. Moreover, the grid element has the effect that an air build-up develops—seen in flow direction—between the blower and the grid element, as a result of which the heating element can transfer more heat to the airflow. By virtue of this, higher outlet temperatures can be achieved at the air discharge opening. Lastly, the grid element also serves as a protection against dirt particles, which could penetrate as far as the heating element via the air discharge opening and the air channel.

A particularly good homogenizing effect of the grid element has been achieved when it is arranged transversely, and in particular at right angles, to the flow direction of the airflow.

It has moreover been found to be advantageous if the grid element covers the entire cross section of the air channel. By virtue of this, on the one hand particularly good protection against dirt particles is afforded, and on the other hand a particularly well homogenized airflow is achieved.

By means of a grid element arranged inside the air channel close to the air discharge opening, it is also possible to achieve the result that the airflow emerges particularly homogeneously at the air discharge opening in the direction of the occupant of the seat.

It has furthermore been found to be especially advantageous if the plurality of flowthrough openings of the grid element can be varied in their clear cross section. By virtue of this, both the homogeneity of the airflow and its rate can be influenced. The clear cross section of the flowthrough openings of the grid element can be varied especially easily by using two grids which are arranged next to one another and displaceable in relation to one another. In this connection, the two grids preferably have the same mesh sizes. If in this connection the meshes of each grid overlap, the clear cross section of the flowthrough openings is at its greatest. If on the other hand the two grids are displaced in relation to one another by half a mesh width in the vertical and the horizontal direction, the smallest clear cross section of the flowthrough openings is obtained.

Further advantages, features and details of the invention will emerge from the following description of two preferred illustrative embodiments and also with reference to the drawings.

BRIEF DESCRIPTION OF THE DRAWINGS

FIGS. 1a and 1b show a diagrammatic, perspective front view and a diagrammatic side view of the backrest of a vehicle seat with the integrated air supply device according to the invention;

DETAILED DESCRIPTION OF THE INVENTION

Figure 2:
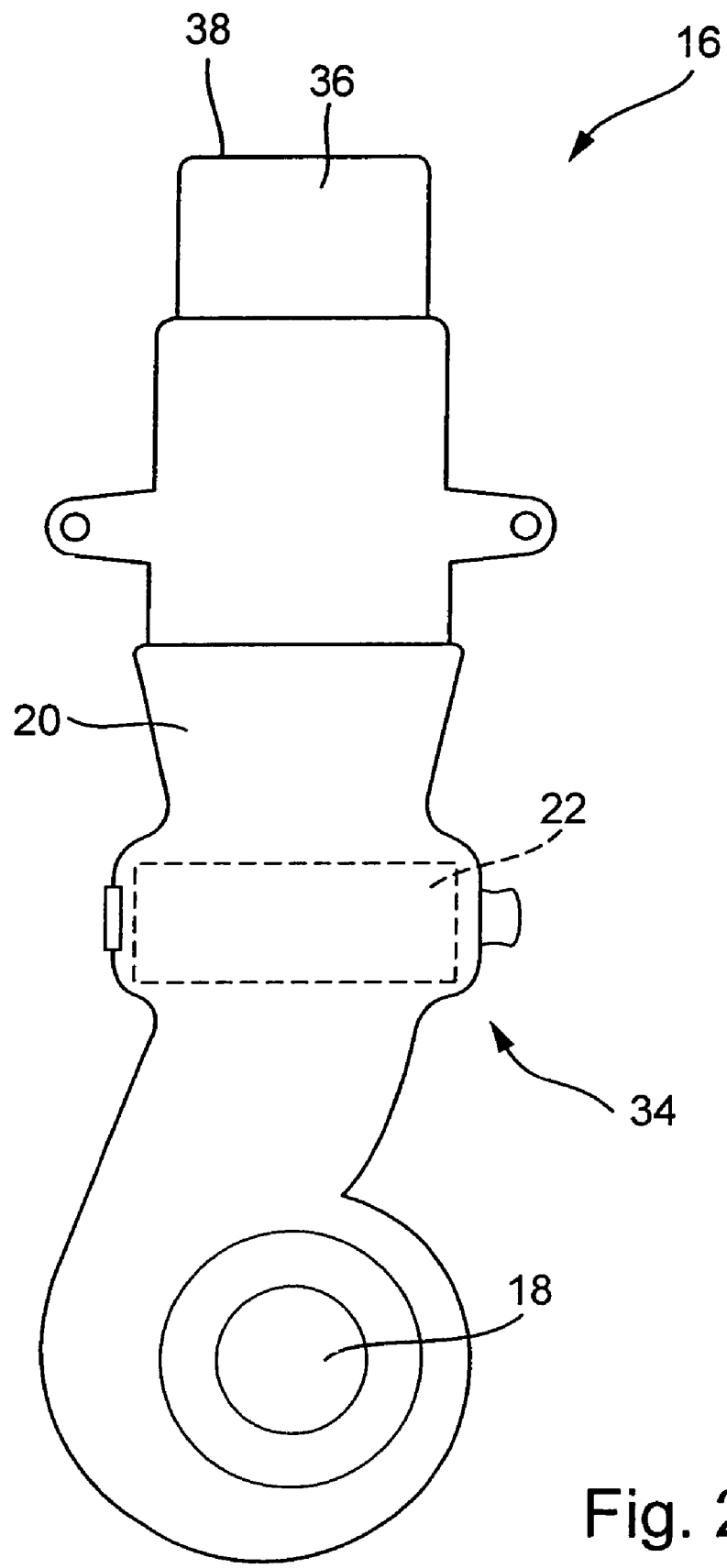
FIG. 2 shows a rear view of the air supply device according to FIGS. 1a and 1b in which a blower can be seen in the lower region and the air supply channel with the air discharge opening arranged at the upper end can be seen above the blower.

In FIGS. 1a and 1b, the backrest 10 of a vehicle seat is indicated in a diagrammatic perspective front view and a diagrammatic side view respectively. Only a rear covering part 12 and a head restraint 14 of the backrest 10 are visible in FIG. 1a. In this case, the vehicle seat is designed as an integral seat, the head restraint 14 being arranged in front of the backrest 10, overlapping it. The head restraint 14 is height-adjustable in relation to the backrest 10 via guide means (not shown). An air supply device 16, which comprises as fundamental components a diagrammatically indicated blower 18 at the lower end of the air supply device and an air channel 20 arranged above the blower 18, is attached to the rear covering part 12 of the backrest 10. A heating element 22, indicated only in dashed lines in FIG. 1a, with which the airflow generated by the blower 18 can be heated, is provided inside the air channel 20 at a distance above and on the pressure side of the blower 18. At the upper end, the air channel 20 extending upright is angled toward the front in an L shape and ends in an air discharge opening 24. In this connection, the air channel 20 ends in the region of the air discharge opening 24 in a plane with the front side 26 of the head restraint 14. A grid element 32, which will be explained in greater detail below with reference to FIGS. 3a and 3b and 4a and 4b, is indicated inside the air channel 20 close to the air discharge opening 24. Moreover, in FIG. 1b, a side cheek 28 of the backrest 10 is also visible, as is—indicated in dashed lines—the course of the upholstery cover 30 in the central surface region of the backrest 10. This also makes it possible to see that the air supply device 16 is arranged completely inside the backrest 10 and only the air discharge opening 24 is visible from outside.

FIG. 2 shows the air supply device 16 according to FIGS. 1a and 1b in a rear view. In the present illustrative embodiment, the blower 18 visible at the lower end of the air supply device 16 comprises an inlet opening (not visible) arranged on the front side of the blower 16. In this connection, it is clear that a free space, from which the blower 18 can draw air, must be present between the upholstery indicated in FIG. 1b in the region of the flat surface of the backrest 10 and the inlet opening of the blower 18. A belly-like widening 34 of the air channel 20, inside which—as indicated in dashed lines—the heating element 22 is accommodated, is visible on the pressure side above the blower 18. At the upper end of the air supply device 16, the L-shaped part 36, which comprises the air discharge opening 24, is designed as an element which is telescopically vertically displaceable inside the air channel 20. By virtue of this, the L-shaped part 36 can be height-adjusted together with the head restraint 14. In the illustrative embodiment shown here, both the air channel 20 and the L-shaped part 36 are made of plastic. In this connection, the housing 38 of the blower 18 is connected in one piece to the air channel 20. The air channel 20 and the L-shaped part 36 have a roughly rectangular cross section essentially over their entire length.

Figure 3A:
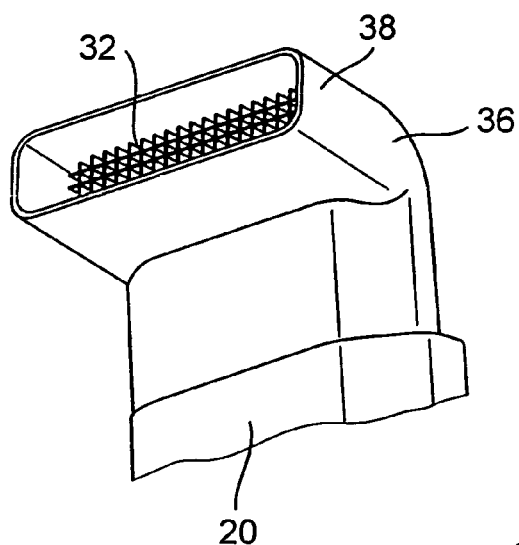
FIGS. 3a and 3b show a perspective view and a front view of the upper end of the air channel with the air discharge opening according to FIG. 2, a grid element being provided according to the invention close to the air outlet opening.
Figure 3B:
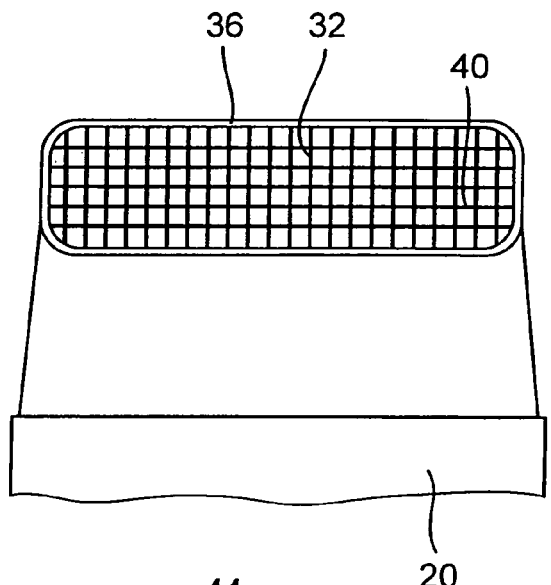

In FIGS. 3a and 3b, the upper part of the air channel 20 with the L-shaped part 36 guided slidingly therein is illustrated in a perspective view and in a front view respectively. It can be seen from FIG. 3a in particular that the upper part 38 of the L-shaped part 36 extends roughly horizontally. The grid element 32, which is arranged transversely to the flow direction of the airflow flowing through the air channel 20, or rather the upper channel part 38, is arranged close to the air discharge opening 24 inside this roughly horizontal channel part 38. It is clear that the grid element 32 does not necessarily have to be arranged in the upper channel part 38 of the air channel 20, or rather of the L-shaped part 36. In this connection, it would thus also be conceivable for the grid element 32 to be arranged in the upright part of the air channel 20 between the heating element 22 and the air discharge opening 24. In the present illustrative embodiment, the grid element 32 covers the entire cross section of the air channel 20, or rather of the L-shaped channel part 36. In this case, the plurality of flowthrough openings 40 have a clear cross section or mesh size of preferably roughly 2 to 5 mm. In the present illustrative embodiment, the grid element 32 is made of plastic; other materials would likewise also be possible, in particular a wire mesh or the like.

A homogenization of the airflow generated by the blower 18 and affected by turbulence as it flows through the heating element 20 is achieved by means of the grid element 32 arranged inside the air channel 20, or rather the channel part 38. The grid element 32 moreover has the effect of causing the airflow flowing through to build up slightly. As a result, the airflow arrives at the occupant of the seat at a slightly lower rate than without a grid element 32, which has proved to be especially advantageous with regard to the comfort experience of the occupant. The air build-up at the grid element 32 also causes the airflow to remain slightly longer in the air channel 20 and close to the heating element 22. More heat can consequently be transferred to the airflow by the heating element 22. This consequently results in a higher air outlet temperature in the region of the air discharge opening 24.

Figure 4A:
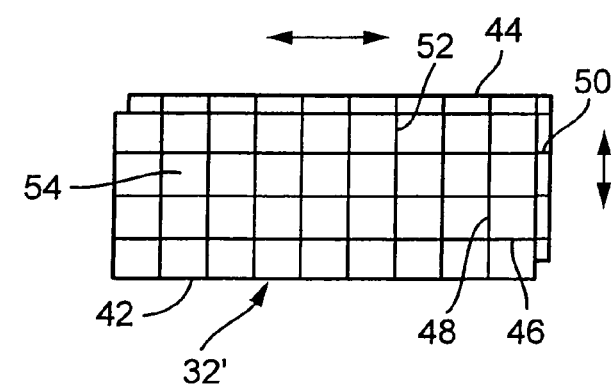
FIGS. 4a and 4b show a front view of the grid element according to a further embodiment of the invention, in which two grids which are parallel to one another and displaceable in relation to one another are provided.
Figure 4B:
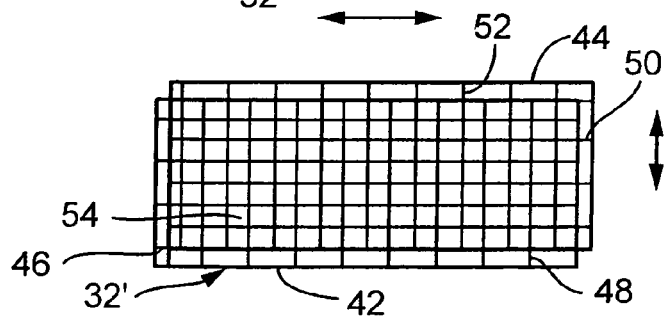

A further embodiment of the grid element 32 is illustrated in a diagrammatic front view in FIGS. 4a and 4b. While the grid element 32 illustrated in FIGS. 3a and 3b is essentially designed in one piece, the grid element 32' according to FIGS. 4a and 4b comprises essentially two grids 42, 44 arranged parallel next to one another which are both horizontally and vertically displaceable in relation to one another. To this end, one of the two grids 42, 44 is arranged in a fixed manner, whereas the other grid 42, 44 is displaceable in its grid plane. The displacement in the horizontal and vertical directions is indicated symbolically in each case with the two arrows. In FIG. 4a, the horizontal and vertical grid bars 46, 48 of the front grid 42 overlap the respective horizontal and vertical grid bars 50, 52 of the rear grid 44. In other words, the meshes of the front grid 42 and of the rear grid 44 lie congruently over one another. As a result, the flowthrough openings 54 formed by the grid bars 46-52 of the two grids 42, 44 have a maximum clear cross section which corresponds to the clear cross section or mesh size of each of the grids 42, 44.

FIG. 4b illustrates the two grids 42, 44 displaced in relation to one another. In this connection, one grid 44 has been displaced by roughly the length of half the clear cross section of a flowthrough opening 54 in both the horizontal and the vertical direction. It can be seen that, as a result, the plurality of flowthrough openings 54 each have a clear cross section which is only a quarter of the size of that in the arrangement of the two grids 42, 44 shown in FIG. 4a. It can also be seen that any clear cross sections of the flowthrough openings 54 or mesh sizes of the grid element 32' can be achieved by displacing one grid 44 in relation to the other grid 42 in both the horizontal and the vertical direction. By virtue of this, it is possible as a result to influence the flowthrough rate through the grid element 32' and the homogeneity and the temperature of the airflow.

The invention claimed is:

1. An air supply device for a vehicle seat comprising:
   an air channel,
   an air discharge part, which comprises at least one air discharge opening provided in a head restraint of the seat facing towards a front side of the head restraint for supplying a head, shoulder and neck area of an occupant of the seat with an airflow,
   a blower having a pressure side on which the air channel is arranged,
   a heating element arranged in the air channel between the blower and the air discharge part, and
   a grid element arranged inside the air discharge part between the air discharge opening and the heating element,
   wherein the arid element is positioned at a distance behind the front side of the head restraint.

2. The air supply device as claimed in claim 1, wherein the grid element is arranged transversely to a flow direction of the airflow flowing through the air discharge part.

3. The air supply device as claimed in claim 1, wherein the grid element covers an entire cross section of the air discharge part.

4. The air supply device as claimed in claim 1, wherein the grid element is arranged close to the air discharge opening of the air discharge part.

5. The air supply device as claimed in claim 1, wherein the grid element comprises a plurality of flowthrough openings of which a clear cross section is variable.

6. The air supply device as claimed in claim 5, wherein the grid element comprises at least two grids arranged next to one another which are displaceable in relation to one another.

7. The air supply device as claimed in claim 1, wherein the grid element serves to moderate turbulence of an airflow discharged from said air channel extending within said backrest of said vehicle seat.

8. The air supply device as claimed in claim 7, wherein the grid element further serves to facilitate transfer of heat from the heating element to said airflow.

9. The air supply device as claimed in claim 1, wherein the air discharge part is an L-shaped part.

10. The air supply device as claimed in claim 2, wherein the air discharge part is an L-shaped part.

11. The air supply device as claimed in claim 5, wherein the air discharge part is an L-shaped part.

12. The air supply device as claimed in claim 6, wherein the air discharge part is an L-shaped part.

13. The air supply device as claimed in claim 1, wherein the air channel extends within a backrest of the vehicle seat.

* * * * *